United States Patent
Raz et al.

(10) Patent No.: US 12,269,482 B2
(45) Date of Patent: Apr. 8, 2025

(54) SYSTEMS AND METHODS FOR EYE GAZE BASED ALERTNESS MEASUREMENT

(71) Applicant: Gentex Corporation, Zeeland, MI (US)

(72) Inventors: Guy Raz, Binyamina (IL); Robert Steel, Coventry (GB)

(73) Assignee: GENTEX CORPORATION, Zeeland, MI (US)

( * ) Notice: Subject to any disclaimer, the term of this patent is extended or adjusted under 35 U.S.C. 154(b) by 105 days.

(21) Appl. No.: 18/121,613

(22) Filed: Mar. 15, 2023

(65) Prior Publication Data
US 2023/0294706 A1 Sep. 21, 2023

Related U.S. Application Data

(60) Provisional application No. 63/321,157, filed on Mar. 18, 2022.

(51) Int. Cl.
G08B 23/00 (2006.01)
B60W 40/08 (2012.01)
B60W 50/14 (2020.01)
G06V 20/58 (2022.01)
G06V 20/59 (2022.01)

(52) U.S. Cl.
CPC ........... B60W 40/08 (2013.01); B60W 50/14 (2013.01); G06V 20/58 (2022.01); G06V 20/597 (2022.01); B60W 2040/0818 (2013.01); B60W 2420/403 (2013.01); B60W 2540/225 (2020.02); B60W 2540/229 (2020.02)

(58) Field of Classification Search
CPC ............... B60W 40/08; B60W 50/14; B60W 2040/0818; B60W 2420/403; B60W 2540/225; B60W 2540/229; G06V 20/58; G06V 20/597; G06V 40/18
See application file for complete search history.

(56) References Cited

U.S. PATENT DOCUMENTS

| 6,572,233 B1 | 6/2003 | Northman et al. |
| 6,989,754 B2 * | 1/2006 | Kisacanin ............. G06V 20/58 340/576 |
| 7,835,834 B2 * | 11/2010 | Smith ................. B60K 28/066 340/576 |

(Continued)

FOREIGN PATENT DOCUMENTS

| CN | 109677399 A | 4/2019 |
| JP | 2008210285 A | 9/2008 |
| KR | 20150076797 A | 7/2015 |

Primary Examiner — Toan N Pham
(74) Attorney, Agent, or Firm — Price Heneveld LLP; Brian James Brewer

(57) ABSTRACT

A system for monitoring an alertness level of an occupant of a vehicle includes a first sensor operable to detect an event exterior to the vehicle. A second imager is operable to capture an image of the occupant. A controller is in electrical communication with the first sensor and the second sensor. The controller is configured to determine a target direction aligning with a region of the event. The controller is further configured to determine a viewing direction of the occupant based on the image. The controller is further configured to compare the target direction to the viewing direction. The controller is further configured to determine the alertness level of the driver based on the comparison of the target direction to the viewing direction.

20 Claims, 7 Drawing Sheets

(56) References Cited

U.S. PATENT DOCUMENTS

| | | | |
|---|---|---|---|
| 8,144,002 B2* | 3/2012 | Kiuchi | G01B 11/26 |
| | | | 340/436 |
| 8,201,800 B2 | 6/2012 | Filipiak | |
| 8,210,695 B2 | 7/2012 | Roth et al. | |
| 8,237,909 B2 | 8/2012 | Ostreko et al. | |
| 8,264,761 B2 | 9/2012 | Cammenga et al. | |
| 8,339,526 B2 | 12/2012 | Minikey, Jr. et al. | |
| 8,411,245 B2 | 4/2013 | Lee et al. | |
| 8,643,931 B2 | 2/2014 | Cammenga et al. | |
| 8,646,924 B2 | 2/2014 | Roth et al. | |
| 8,814,373 B2 | 8/2014 | Steel et al. | |
| 8,847,771 B2* | 9/2014 | Gunaratne | G08B 21/0476 |
| | | | 340/576 |
| 8,885,240 B2 | 11/2014 | Roth et al. | |
| 8,925,891 B2 | 1/2015 | Van Huis et al. | |
| 8,960,629 B2 | 2/2015 | Rizk et al. | |
| 9,174,577 B2 | 11/2015 | Busscher et al. | |
| 9,244,249 B2 | 1/2016 | Kim et al. | |
| 9,316,347 B2 | 4/2016 | Roth | |
| 9,650,041 B2* | 5/2017 | Feit | B60W 40/08 |
| 9,838,653 B2 | 12/2017 | Fish, Jr. et al. | |
| 9,971,224 B2 | 5/2018 | Toko | |
| 9,975,483 B1 | 5/2018 | Ramaswamy | |
| 2009/0153651 A1 | 6/2009 | Verhaegh et al. | |
| 2014/0210978 A1 | 7/2014 | Gunaratne et al. | |
| 2017/0075186 A1 | 3/2017 | Gates et al. | |
| 2019/0106106 A1 | 4/2019 | Hanna | |
| 2020/0019034 A1 | 1/2020 | Agowski et al. | |
| 2020/0353868 A1 | 11/2020 | Schut | |
| 2021/0072612 A1 | 3/2021 | Niu et al. | |

* cited by examiner

SYSTEMS AND METHODS FOR EYE GAZE BASED ALERTNESS MEASUREMENT

CROSS-REFERENCE TO RELATED APPLICATIONS

This application claims priority under 35 U.S.C. § 119(e) and the benefit of U.S. Provisional Application No. 63/321,157 entitled SYSTEMS AND METHODS FOR EYE GAZE BASED ALERTNESS MEASUREMENT, filed on Mar. 18, 2022, by Guy Raz, et al., the entire disclosure of which is incorporated herein by reference.

TECHNOLOGICAL FIELD

The present invention generally relates to an alertness measurement device, and, more particularly, to an eye gaze based alertness measurement device.

BACKGROUND OF THE DISCLOSURE

Reaction time of an operator of a vehicle may be associated with weariness of the operator. Existing systems and methods of measuring reaction times of the operator are limited.

SUMMARY OF THE DISCLOSURE

According to one aspect of the present disclosure, a system for monitoring an alertness level of an occupant of a vehicle is disclosed. The system includes a first sensor operable to detect an event exterior to the vehicle. A second sensor is operable to capture an image of the occupant. A controller is in electrical communication with the first sensor and the second sensor. The controller is configured to determine a target direction aligning with a region of the event. The controller is further configured to determine a viewing direction of the occupant based on the image. The controller is further configured to compare the target direction to the viewing direction. The controller is further configured to determine the alertness level of the occupant based on the comparison of the target direction to the viewing direction.

According to another aspect of the present disclosure, a method for monitoring an alertness level of an occupant of a vehicle is disclosed. The method includes capturing a first image of an event exterior to the vehicle via a first imager. The method further includes capturing a second image of an eye of the occupant via a second imager. The method further includes, at a controller in communication with the first imager and the second imager, determining position data corresponding to a location of the event relative to the occupant based on the first image. The method further includes, at the controller, determining a gaze direction of the eye based on the second image. The method further includes, at the controller, measuring an elapsed time from a first time corresponding to an occurrence of the event to a second time corresponding to the gaze direction meeting a target direction aligning with the location of the event. The method further includes, at the controller, determining the alertness level of the occupant based on the elapsed time.

These and other features, advantages, and objects of the present invention will be further understood and appreciated by those skilled in the art by reference to the following specification, claims, and appended drawings.

DETAILED DESCRIPTION

Figure 1:
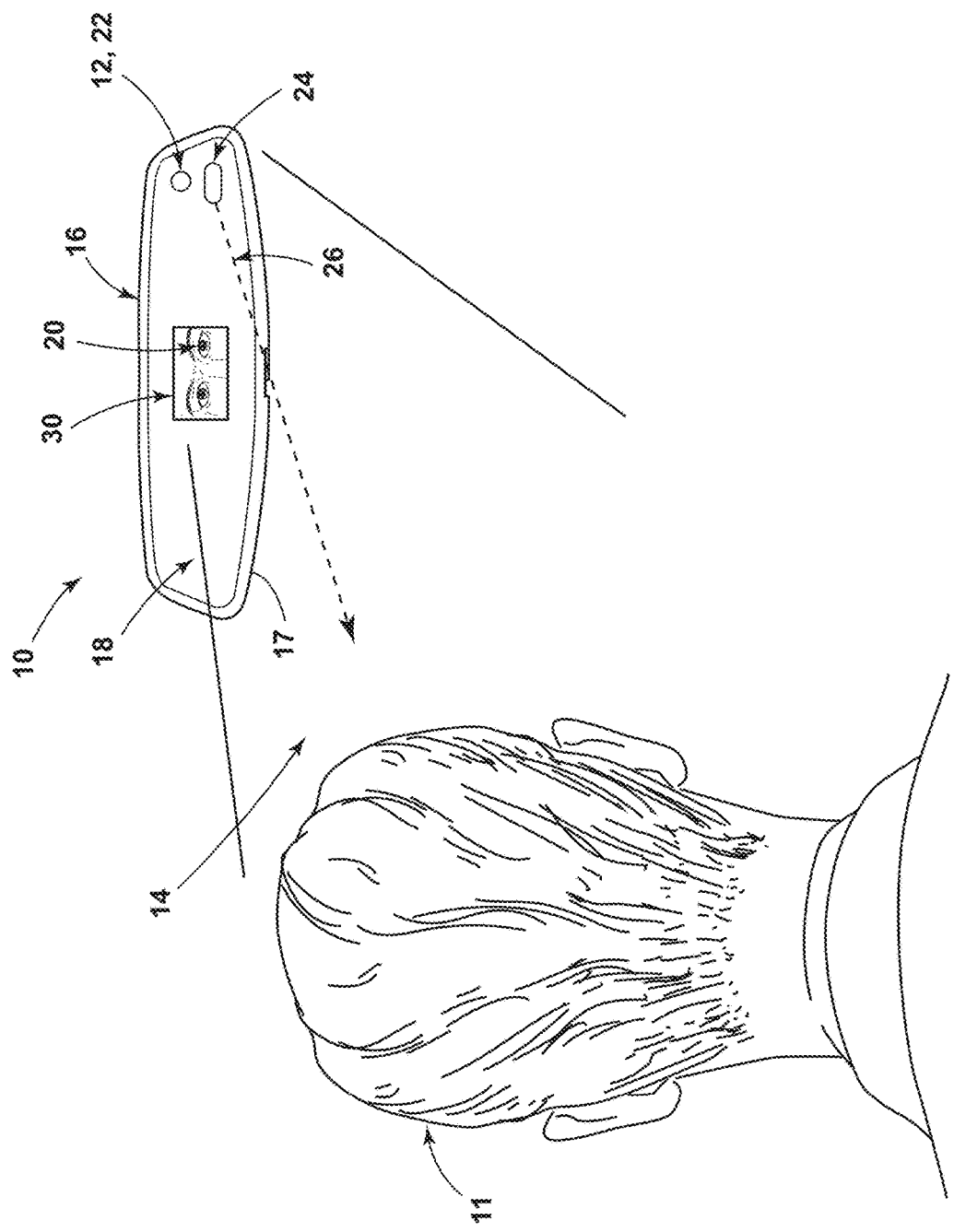
FIG. 1 is an illustrative view of a display apparatus assembly comprising an alertness measurement device.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the assembly of the element closer to an intended viewer of the mirror element, and the term "rear" shall refer to the assembly of the element further from the intended viewer of the mirror element. However, it is to be understood that the invention may assume various alternative orientations, except where expressly specified to the contrary. It is also to be understood that the specific devices and processes illustrated in the attached drawings, and described in the following specification are simply exemplary implementations of the inventive concepts defined in the appended claims. Hence, specific dimensions and other physical characteristics relating to the implementations disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

The terms "substantial," "substantially," and variations thereof as used herein are intended to note that a described feature is equal or approximately equal to a value or description. For example, a "substantially planar" assembly is intended to denote an assembly that is planar or approximately planar. Moreover, "substantially" is intended to denote that two values are equal or approximately equal. In some implementations, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes implementations having two or more such components unless the context clearly indicates otherwise.

Referring to FIGS. 1-4, the disclosure provides for a driver monitoring system 10. In operation, the system 10 may determine the alertness or attentiveness of an operator (generally referred to as a driver 11) of a vehicle in response to one or more detected events, objects, or changes in scenery that may be present in the local environment of the vehicle. The attentiveness of the driver 11 may be monitored by the system 10 via a combination of an interior monitoring device 12 in combination with an exterior monitoring device 13 (see FIG. 3). In operation, the exterior monitoring device 13 may detect the event or object in the local environment of the vehicle, and the interior monitoring device 12 may detect the response of the driver 11 to the detected event or object. Based on the reaction delay, timing, or response of the driver 11, the system 10 may determine an alertness level or state of the driver 11, which may be representative of the driver's observance or attentiveness to the operation of the vehicle. The alertness level of the driver 11 may alternatively be based on an aggregated reaction time (e.g., an average reaction time, a median reaction time, etc.) for multiple objects or events presented during a driving trip. In addition to the response of the driver 11, the attentiveness may be determined based on a number of factors including the nature or relative significance of the events or objects detected in the local environment to improve the accuracy of the assessment of the driver 11.

The exterior monitoring device 13 may include one or more cameras or sensors configured to detect objects or events in the local environment of the vehicle. Based on the sensor or image data captured by the exterior monitoring device 13, the system 10 may perform an event detection function and a viewing direction detection function. The event detection function may detect that an event has occurred in the exterior environment based on sensor data from the exterior monitoring device 13. The event or object may be detected based on identification of the object or event, movement directions, scale, or proportions in the sensor data, proximity of the object or event to the vehicle, state changes of an object, and the like. One exemplary event that may be detected is the presence of a regulatory object, such as a stop sign, traffic light, or crosswalk. Another exemplary event may be a status change of a regulatory object, such as a traffic light changing from a "go" state (e.g., green light) to a "slow" or "stop" state (e.g., yellow or red lights, respectively). Other exemplary events or objects that may be detected include activities of other users of a roadway, such as pedestrians and other vehicles (e.g., a pedestrian crossing the roadway, a vehicle turning, etc.).

Once detected and/or identified, the event may be compared to other events detected in the exterior to identify the event having highest priority for requiring attention of the driver 11. More particularly, once an object is detected and/or identified, a classification process of the event detection function may compare the event to an event library stored in a memory of the alertness measurement system 10. If the event associated with the object corresponds to an event stored in the event library, the classification process may assign the classified event with a priority level. A prioritization process may compare the priority levels assigned to the events to determine a target gaze direction for the driver 11. Stated differently, the prioritization process may be employed to identify the most important event in the environment for the driver 11 to direct attention.

The gaze direction detection function may operate in concert with the event detection function in order to determine a response of the driver 11 to the object or event identified by the exterior monitoring device 13. In operation, the gaze direction detection function may include an ocular tracking or identification process and a point-of-interest estimation process. The ocular identification process may capture image data of a cabin of the vehicle and process the interior image data to identify the eyes of the driver 11. The point-of-interest estimation process may include identifying an ocular characteristic of the eyes, such as a pupillary distance, corneal reflection, retinal vessel detection, and/or the like to estimate a gaze direction of or a point of interest of the passenger. The point of interest may refer to a point in space that the driver 11 is focused on. Once the gaze direction is identified, a controller of the system may monitor the gaze direction of the driver 11 in response to various events detected by the event detection function.

In general, the event detection function and the gaze direction detection function may be implemented in real time to gauge how attentive the driver 11 is to an exterior event. For example, a reaction time of the driver 11 to an event may be measured and compared to an ideal or an average reaction time of other drivers experiencing a similar event. The reaction time may be a duration from when the event occurs and when the gaze direction matches the target gaze direction. The reaction time may thus provide a quantifiable metric that corresponds to driver alertness. By determining the alertness level, the system 10 may identify a number of states, such as a distracted state, an intoxicated state, a drowsy state, and the like, and alert the driver 11 and/or other occupants 11 of the vehicle to the detected state. In some examples, the system 10 may be employed to communicate with one or more vehicle operation modules, such as a power steering system, a braking system, and/or an ignition system, to slow or stop the vehicle in response to the attentiveness level reaching a predetermined threshold. The system 10 may also be employed to improve reaction time of the driver 11 by, for example, communicating instructions for modifying a target distance from another vehicle for an adaptive cruise control function, increasing sensitivity of a blind zone detection function, and/or modifying heat distribution or an illumination of a panel of a console. In these ways, the system 10 may provide a safety feature for the vehicle, the occupants 11, and pedestrians by limiting operation of the vehicle to attentive operators.

Referring more particularly to FIG. 1, the gaze direction detection function may be based on image data captured in a field of view 14 of the interior monitoring device 12. In an exemplary implementation, the alertness measurement system 10 may be incorporated in an interior rearview mirror display, hereafter referenced as a display assembly 16. In alternative examples, the alertness measurement system 10 may be incorporated into a dashboard panel of the vehicle, an overhead console of the vehicle, and/or a steering column of the vehicle. As shown, the display assembly 16 may be configured to be incorporated in an automotive vehicle. The display assembly 16 may include a housing 17. The housing 17 may incorporate an electro-optic assembly 18 having an electrochromic mirror element. The various components of the electro-optic assembly 18 and the alertness measurement device 10 may be incorporated within the housing 17 of the display assembly 16. In this way, the various components discussed herein may be substantially hidden from view of the driver 11 of the vehicle. Accordingly, the disclosure may provide for various advanced functions of an electro-optic assembly 18 and the alertness measurement system 10 while maintaining an appearance of a conventional rearview mirror. In some embodiments, the display assembly 16 may not include an electro-optic assembly 18. Though discussed in reference to the driver 11, the disclosure may be applied monitor any user of the vehicle (e.g., an occupant). The occupant may be the driver/operator 11 of the vehicle or a non-operator passenger of the vehicle.

In operation, the alertness measurement system 10 may capture image or scanning data representing eyes 20 of the driver 11. Based on the image data, the system 10 may estimate the point of interest (e.g., a region of focus or attention) of the driver 11 in response to one or more ocular characteristics. The ocular characteristics may be identified by illuminating the eyes with infrared or near-infrared light, as further discussed in reference to FIGS. 2A and 2B. These functions may utilize infrared illumination of an iris or cornea of the eye 20 in order to illuminate the eyes 20 for the identification (see FIGS. 2A and 2B). Such illumination may be optimized in conditions allowing for a high optical transmittance in the near infrared (NIR) range. In some implementations, the disclosure may provide for an electrochromic (EC) stack of the electro-optic assembly 16 that may have a high light transmittance in the NIR range, for example, wavelengths of light ranging from 800 nm to 940 nm. In configurations having the EC stack omitted, the display assembly 16 may have a similar high light transmittance in the NIR range.

To provide for the eye-scan identification function and the gaze direction detection function, an imager 22 of the interior monitoring system 12 may be disposed within the housing 17 of the display assembly 16 and/or incorporated in or in connection with the vehicle. The imager 22 may correspond to, for example, a digital charge-coupled device (CCD) or complementary metal-oxide-semiconductor (CMOS) active pixel sensor, although it may not be limited to these exemplary devices. The imager 22 may be in communication with at least one light source 24, which may correspond to one or more infrared emitters configured to output an emission 26 of light in the NIR range. In this configuration, the imager 22 may be configured to selectively activate the one or more infrared emitters corresponding to the at least one light source 24 to illuminate the eyes 20, such that an identity of the driver 11 of the vehicle and/or a looking direction of the eyes 20 may be determined.

The system 10 may include a controller 28 in communication with the interior and exterior monitoring devices 12, 13, as well as various vehicle systems and accessories, via a communication bus or any other suitable communication interface. In general, the controller 28 may comprise one or more processors or circuits. The processors/circuits may be configured to process interior image data 29a, 29b (see FIGS. 2A and 2B) and exterior image data 29c (see FIG. 4A) received from the interior monitoring system 12 and the exterior monitoring system 13, respectively. For example, the controller 28 may process the image data 29a, 29b from the interior monitoring system 12 (see FIGS. 2A and 2B) with one or more algorithms configured to determine an identity of the driver 11 of the vehicle and/or a point-of-interest estimation of the driver 11. The controller 28 may further process the exterior image data 29c (see FIG. 4A) with one or more algorithms to perform the event detection function. Further detailed discussion of the controller 28 and the various devices that may be in communication therewith are discussed in reference to FIG. 5.

A display screen 30 may be disposed in the display assembly 16. The controller 28 may further be configured to display image data 29 received from one or more vehicle cameras (e.g., the interior monitoring system 12 or a rearview camera) on the display screen 30. In this configuration, the driver 11 of the vehicle may preview the image data 29 as part of an aiming process for the capture of the image data 29. Although it may not be required for operation of the system 10, during a setup routine, the driver 11 may adjust a direction of the field of view 14 of the imager 22, such that the driver 11 is depicted in a field of view demonstrated by the image data. The display screen 30 may be constructed utilizing various technologies, for example LCD, LED, OLED, or other display technologies. Examples of display assemblies that may be utilized with the disclosure may include U.S. Pat. No. 6,572,233 entitled "Rearview Mirror With Display," U.S. Pat. No. 8,237,909 entitled "Vehicular Rearview Mirror Assembly Including Integrated Backlighting for a Liquid Crystal Display (LCD)," U.S. Pat. No. 8,411,245 entitled "Multi-Display Mirror System and Method for Expanded View Around a Vehicle," and U.S. Pat. No. 8,339,526 entitled "Vehicle Rearview Mirror Assembly Including a High Intensity Display," which are incorporated herein by reference in their entirety.

Figure 2B:
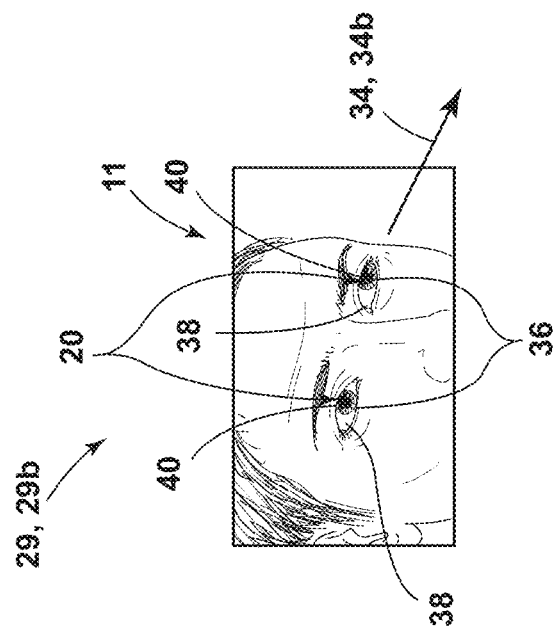
FIG. 2B is a detailed view of exemplary interior image data demonstrating a gaze direction of a user of an alertness measurement device.
Figure 2A:
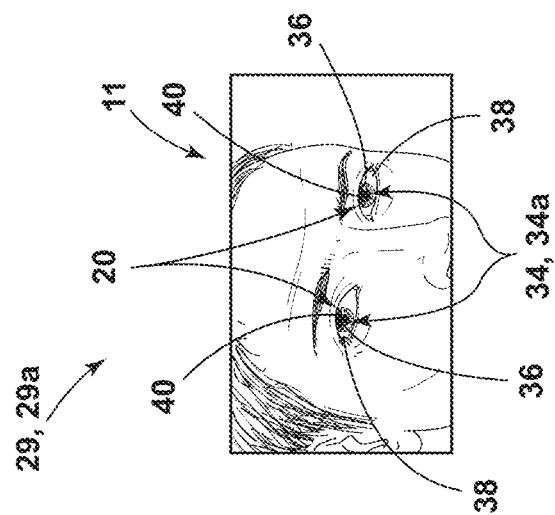
FIG. 2A is a detailed view of exemplary interior image data demonstrating a gaze direction of a user of an alertness measurement device.

Referring to FIGS. 2A and 2B, interior image data 29a, 29b representing detected gaze directions of the driver 11 are demonstrated as first image data 29a and second image data 29b. In some implementations, the controller 28 may be configured to monitor an eye position and/or gaze direction 34 of the eyes 20 of the driver 11, which may be independent of the relative position of the pose of the driver 11 captured in the image data 29a, 29b. As depicted in FIG. 2A, the first image data 29a demonstrates the eyes 20 pitched in a gaze direction 34 in a side and upward direction 34a (e.g., toward the display assembly 16). In contrast, FIG. 2B depicts the second image data 29b demonstrating the eyes 20 pitched in a gaze direction 34 directed in a generally forward direction 34b of the vehicle, indicated by an arrow. In relation to the operation of the system 10, the gaze direction 34 may correspond to the eyes 20 of the driver 11 aligned with or directed toward an event exterior to the vehicle. In operation, the controller 28 may monitor the image data 29a, 29b to determine changes in the gaze direction 34 that may correspond to one or more events detected by the exterior monitoring device 13. Other features relevant to processing image data for authentication purposes are disclosed in U.S. Patent Application Publication No. 2020/0353868, entitled "Eye Gaze Based Liveliness and Multi-Factor Authentication Process," which is incorporated herein by referenced in its entirety.

In general, the gaze direction 34 of the driver 11 may also indicate the relative point of interest or a point of attention of the driver 11, which may correspond to the location of the object. Although the gaze direction 34 may be associated with a line-of-sight and, therefore, have a multitude of possible viewing points along the line of sight, the controller 28 may incorporate the exterior image data 29c to estimate the likely point of attention of the driver 11. For example, if there is only one event detected in a certain gaze direction 34 and the driver 11 has that gaze direction 34, then the controller 28 may determine that the point of interest likely corresponds to the sole event detected in the exterior image data 29c. Further, the controller 28 may track movement of the eyes 20 over multiple frames to determine that the eyes 20 are focused on or are directed to an object moving relative to the vehicle (e.g., due to the vehicle approaching the event). In this way, the point of interest of the driver 11 may be identified and utilized to compare to a target point of attention, as opposed to a target direction more generally. It is generally contemplated that the target gaze direction may have a corresponding acceptable range (e.g., angular tolerance) to allow for slight differences in eye/head position of the driver 11.

The direction of the gaze may be calculated by the controller 28 based on a rotation and projected visual direction of the eyes 20 of the driver 11. The accuracy of such a determination may be improved or optimized by the controller 28 based on a calibration feature. The calibration feature may be configured to calibrate the determination of the gaze direction 34 of the driver 11 based on the particular spatial relationships of features of the eyes 20 (e.g., ocular features, such as a shape of an iris 36; a shape and orientation of corneas 38 of the eyes 20; reflections 40; pupillary distance; retinal blood vessels; etc.) identified within the field of view 14. Though the system 10 may be operable to identify the gaze direction 34 without the calibration routine, the generation of the driver 11 template and training of the determination of the gaze direction 34 for one or more common occupants 11 may improve the operation of the device. Accordingly, the controller 28 may be configured to identify an ocular characteristic of the driver 11, such as a pupillary distance or other ocular characteristics (e.g., corneal reflection, retinal vessel detection, etc.), to identify the gaze direction 34 based on the image data 29a, 29b. In this way, the system 10 may accurately identify the gaze direction 34 of the driver 11 and determine whether the gaze direction 34 is aligned with the event detected in the exterior image data 29c.

Figure 3:
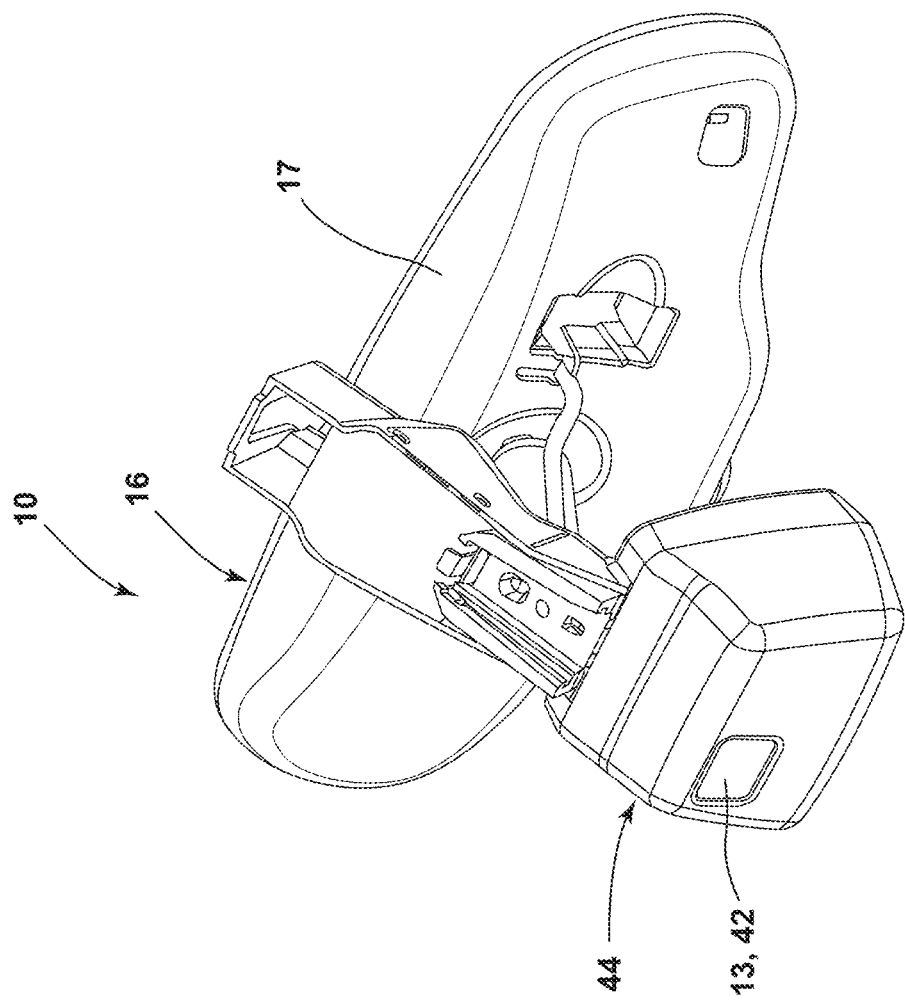
FIG. 3 is a perspective view of an interior rearview display assembly incorporating an alertness measurement device.

Referring now to FIG. 3, the exterior monitoring system 13 may include a sensor 42 employed to capture one or more events external to the vehicle. The sensor 42 may be an imaging device (e.g., a camera) positioned within a portion of a vehicle wall or, as depicted, positioned within a portion of the display assembly 16. More particularly, the sensor 42 may be positioned on a rear surface of the interior rearview display assembly 16. In this way, the sensor 42 may be operable to capture a front view from the vehicle. The sensor 42 may be incorporated into the main housing (e.g., housing 17) of the display assembly 16 or into an auxiliary housing 44, as depicted. The sensor 42 and the imager 22 may be incorporated into the same housing facing generally opposing directions. The sensor 42 may provide for capturing the exterior image data 29c for the controller 28 to process and identify one or more events.

According to some aspects of the present disclosure, the sensor 42 may be positioned at a back portion of the vehicle for detecting an event occurring behind the vehicle while the vehicle is reversing or is in a reverse gear. The operational principles of the forward-facing imager described above may match a rearward-facing imager. In this operation, the target direction for the eyes 20 of the driver 11 may be toward a specific region of the interior rearview display assembly 16 and/or external rearview mirror assemblies positioned adjacent driver side and/or front passenger side doors. In some embodiments, the sensor 42 may be positioned adjacent sides of the vehicle or atop the vehicle roof to capture images from the perspective of the driver side and/or passenger side. In this way, events occurring to the sides or rear of the vehicle may be detected by the exterior monitoring device 13.

According to one embodiment, the sensor 42 may include a plurality of imagers that may be employed as a stereoscopic arrangement. The stereoscopic arrangement may enhance effectiveness of the sensor 42 and provide for increased accuracy with respect to detecting the depth at which the events occur. For greater redundancy still, the plurality of imagers, or the single imager, can be combined with distance measuring detectors (e.g. LIDAR, SONAR, IR time-of-flight sensor, etc.). Distance measurements from such distance measuring technologies may assist the controller 28 with determining distances for various portions of a scene, thereby easing processing requirements and simplifying image extraction. In some configurations, an imager for the exterior monitoring system 13 may be omitted and the sensor 42 may be one or more radio-frequency (e.g., RADAR) or laser imaging (e.g., LIDAR) devices employed for monitoring distances to objects in or around the roadway.

Figure 4A:
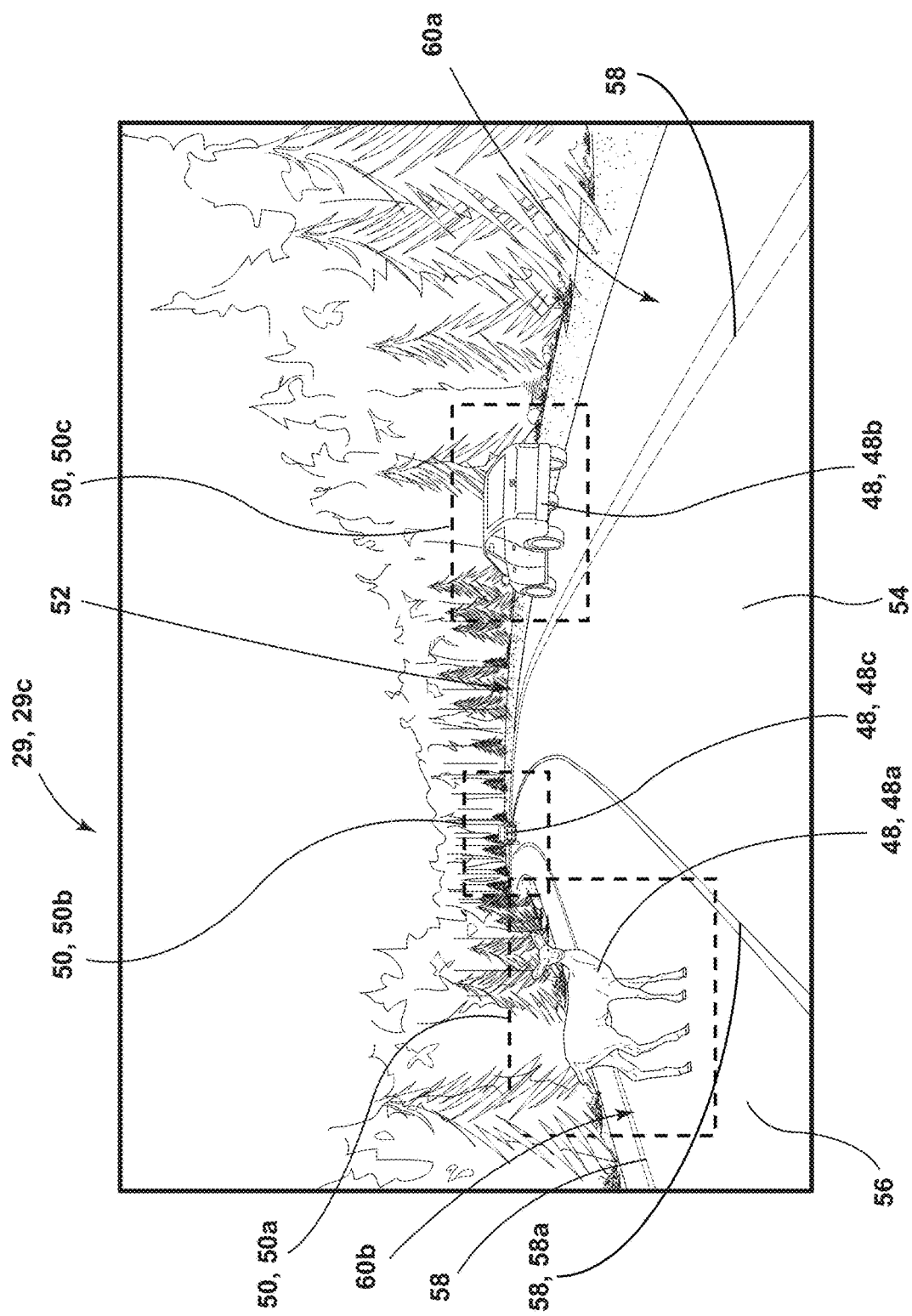
FIG. 4A is a field of view of a front-facing camera for a vehicle capturing one or more events external to the vehicle.
Figure 4B:
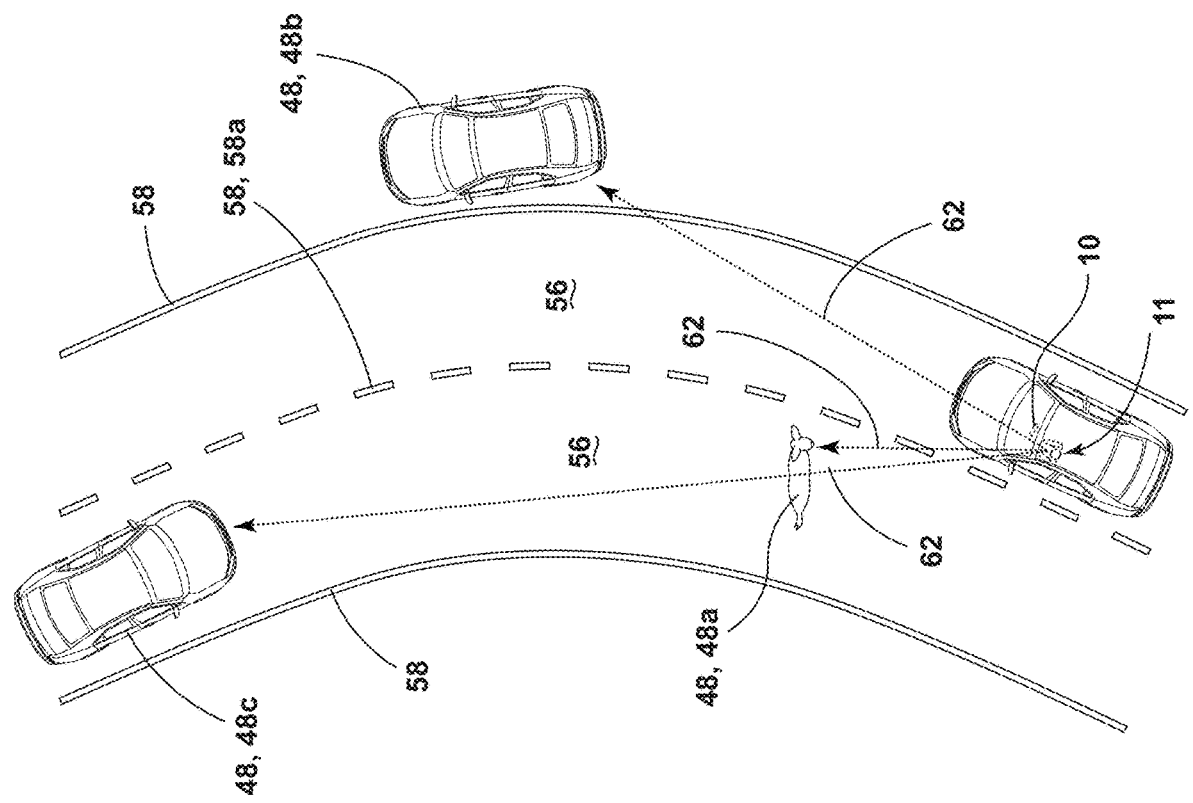
FIG. 4B is a top view of the one or more events captured in the field of view of FIG. 4A.

Referring now to FIGS. 4A and 4B, examples of events/objects captured by the sensor 42 while the vehicle is moving along a highway are depicted. As previously discussed, the controller 28 may be configured to analyze image data 29c from the sensor 42 by detecting an object 48 (e.g., first object 48a, second object 48b, and third object 48c) corresponding to a region 50 (e.g., first, second, and third regions 50a, 50b, 50c) of the image data 29c. The controller 28 may also be configured to determine the identity of the object 48 and/or determine the location of the object 48. Based on this analysis and/or determination of aspects of the object 48, the controller 28 may be configured to determine an event associated with the object 48 and classify the event with a level of priority. The controller 28 may further prioritize the event relative to a plurality of events occurring in the environment based on the classification. The controller 28 may also be configured to identify roadway types (e.g., highway, freeway, one-way roads, two-way roads) based on detection of road markers, the orientation of other vehicles on the roadway 52, etc. In the illustrative example, the roadway 52 is a two-lane road having a first lane 54 and a second lane 56 distinguished via lane lines 58, as well as first and second roadsides 60a, 60b alongside the first lane 54 and the second lane 56, respectively. A median line 58a divides the first lane 54 from the second lane 56.

For example, the controller 28 may be configured to utilize a boundary contrast algorithm to identify the lanes 58 or other markers on the road, such as crosswalks, curbs, and other portions of a roadway 52. The boundary contrast algorithm may include pixel analysis to determine pixel intensity that may be associated with the road markers. Based on the pixel intensity, the controller 28 may detect the presence of the road markers, such as a crosswalk, which may be associated with a prioritized event. For example, detection of a crosswalk by the controller 28 may result in the controller 28 determining a target direction aligning with side areas of the exterior, such that the driver 11 may be required to look both ways at the crosswalk.

The controller 28 may also be configured to utilize an object detection process to identify the objects in the environment. The controller 28 may employ machine learning models trained to determine the identity of various objects, such as humans, animals, traffic markers, and signs. The controller 28 may also utilize a convolutional neural network (CNN), such as a deformable convolutional network, trained to assign weights and/or biases to various pixel values based on, for example, proximity of some pixels relative to other pixels in the image data 29c. Additionally, or alternatively, support vector machines and other non-neural network solutions may be applied to identify objects/events. Similar neural network and/or non-neural network methods may be employed to identify motion events, such as events involving an object moving through space. For example, neural networks specialized for detection of optical flow may be employed to distinguish between actual motion of an object and relative motion of the object due to movement of the observer (e.g., the sensor 42). Though particular image processing methods are discussed herein, the methods are introduced for explanation and not limitation. As such, the disclosure shall not be limited to such exemplary embodiment.

Application of these various algorithms may result in the controller 28 being trained to detect and identify specific objects 48 (such as the first, second, and third objects 48*a*, 48*b*, 48*c*) and/or events stored in the event library that require attention of the driver 11 or another occupant 11. As illustrated in the example shown in FIGS. 4A and 4B, the controller 28 may be configured to identify the regions of the image data 29*c* corresponding to the first, second, and third objects 48*a*, 48*b*, 48*c*. The objects 48 may correspond to a deer 48*a*, a first neighboring vehicle 48*b*, a second neighboring vehicle 48*c*, and any form of object 48 that may be detected by the controller 28 in a plurality of image frames of the image data 29*c*. The objects 48 may be compared to an object library stored in memory to determine the identity of the objects 48. In this way, the controller 28 may be configured to detect a variety of objects 48 in the image data 29.

The controller 28 may also be configured to determine a location of the object 48 relative to the vehicle according to a location detection process, which may include an angle detection algorithm. The angle detection algorithm may be applied to a still image (i.e., a single frame) or a plurality of frames captured over time to determine the angle at which the object 48 is located relative to the sensor 42 and, using distance data corresponding to the location of the driver 11 relative to the sensor 42, determine an angle at which the object 48 is located relative to the driver 11. The angle detection algorithm may incorporate size data of recognizable (e.g., trained) objects 48 to determine an angle relative to the forward direction 34*b* the object 48 is from the sensor 42. The position and/or proportions of the object 48 in the exterior image data 29*c* may be utilized to determine whether the event associated with the object 48 is prioritized (e.g., requiring driver attention), and may be compared to the gaze direction 34 to determine the attentiveness level of the driver 11.

Once objects in the exterior environment are identified, the controller 28 may associate the feature or object 48 with an event having a corresponding priority level association to determine a target direction 62 in which the driver 11 should direct attention. The classification algorithm may compare multiple sequential frames captured by the sensor 42 to identify the event. For example, exterior image data 29*c* captured at a first time may be compared to exterior image data 29*c* captured at a second, later time to identify a shift or motion vector associated with the object 48. The shift may be compared to an expected shift of the object 48 due to vehicle speed to determine whether the shift is due to movement of the object 48. Motion of the object 48 may be incorporated with the identifying information of the object 48 to classify the event. For example, detection of a pedestrian standing at a crosswalk may have first classification, and a pedestrian walking toward the crosswalk may have a second classification. While the first classification may not require immediate attention, a "pedestrian crossing" event (i.e., the second classification) may require immediate attention of the driver 11. To make these classifications, the controller 28 may employ machine learning models trained to detect various movements and poses of pedestrians, movements of vehicles, animals, or other objects.

In many cases, there may be multiple objects 48 and/or events detected by the exterior monitoring system 13. In such cases, the system 10 may prioritize the various objects 48 or events. Based on the priority, the system 10 may assess which of the objects or events is the most important for the driver 11 to view or respond to. In this way, the system 10 may not only assess which objects 48 or events are the most deserving of the attention of the driver 11 but may also determine objects 48 that may be associated with distractions that may not be germane to the operation of the vehicle.

By way of example, the controller 28 may compare an event determined via the classification process to other events associated with the other objects 48 detected in the image data 29*c*. More particularly, the prioritization algorithm may compare priority levels associated with each event, such that the event corresponding to the highest priority has priority over the other events. It is generally contemplated that the priority level may be a chance of contact with the object 48 (e.g., a pedestrian, an animal, a street sign, etc.), the vehicle, the driver 11, or the like. In the example illustrated in FIGS. 4A and 4B, the classification algorithm may first associate the deer 48*a* positioned on the roadway 52 in a walking stance as a "deer crossing" event. The classification algorithm may further associate the first neighboring vehicle 48*b* positioned on the roadside with a "pull-over" event. The classification algorithm may further classify the second neighboring vehicle 48*c* with a "highway passing" event. Each of these events may be further categorized by their distance from the sensor 42, and in turn, the vehicle. In this way, the prioritization algorithm may factor immanency into the determination of priority amongst the plurality of events. The interior monitoring device 12 may accordingly track driver response, such as the gaze direction 34, to align with the highest priority event, and the controller 28 may determine the level of attentiveness based on the response time of the driver 11.

The above described examples are meant to be illustrative and non-limiting. For example, if the second neighboring vehicle 48*c* is determined to have swerved into the first lane 54, a third target direction 62*c* associated with the second neighboring vehicle 48*c* may be prioritized over either target direction 62 based on the priority associated with a contact with the second neighboring vehicle 48*c*. In such case, the gaze direction 34 of the driver 11 may be compared to a target direction aligning with the second neighboring vehicle 48*c*. Other objects not typically moving along the roadway 52 may also be detected and incorporated into the prioritization algorithm, as executed by the controller 28, such as a change of traffic lights, detection of stop signs, speed limit signs, or other regulatory indicators. In one particular example, a light change from green or yellow to red (e.g., a change in the state of the object 48), may be detected and prioritized. In this example, the traffic light state may cause the controller 28 to prioritize this event over other events occurring in closer proximity to the sensor 42 due to a high likelihood of contact with another vehicle. Accordingly, the interior monitoring device 12 may track driver response, such as gaze direction 34, to align with the traffic light, and the controller 28 may determine the level of attentiveness based on when the driver's attention was directed toward the traffic light.

The exterior image data 29*c* may also be processed by the controller 28 to detect objects not related to the operation of the vehicle which may distract the driver 11 from prioritized events. For example, the controller 28 may detect non-regulatory signage, such as advertising signage (e.g., billboards), and environmental scenery such as trees, mountains, and the like. Other examples of objects not related to operation of the vehicle may include buildings or other structures not related to operation of the vehicle. These unrelated objects may be categorized as auxiliary objects and/or auxiliary events by the controller 28. Accordingly, the controller 28 may be configured to detect a deviation from a straight-ahead gaze direction 34 of the driver 11, measure a duration of the deviation, and assign an alertness level score associated with the distraction event. In this way, the controller 28 may track an average distraction time, a median distraction time, or the like of the driver 11 over a trip or over multiple trips.

According to one operation of the alertness measurement device 10, the exterior monitoring device 13 may be employed to capture exterior image data 29c of the exterior environment of the vehicle. The interior monitoring device 12 may be employed to capture interior image data 29a, 29b of the eyes 20 of the driver 11. The controller 28 may be in communication with the exterior monitoring device 13 and interior monitoring device 12 and be configured to process the exterior image data 29c and the interior image data 29a, 29b. Based on the exterior image data 29c, the controller 28 may detect an event exterior to the vehicle. The controller 28 may then identify the event and determine, based on a priority level associated with the event, whether an ocular response is warranted. In response to an event or object identified with a priority that warrants a driver response (e.g., a response event), the controller 28 may track the eyes 20 of the driver 11 via the interior image data 29a, 29b to determine whether the driver 11 is shifting gaze direction 34 toward the event. The controller 28 may measure the delay from when the event was detected to when the driver 11 was looking toward the identified event. The controller 28 may then determine whether the driver's response time was quick enough to be considered an "attentive" response. Additionally, or alternatively, the controller 28 may determine an attentiveness level assigned to the response or a plurality of the responses. For example, the alertness or weariness level of the driver 11 may be based on a plurality of response times associated with a plurality of events detected over time, such as since the vehicle was started or in a drive gear. In this way, the controller 28 may be operable to calculate the average, median, and/or mode response time. In some examples, the response times may be weighted unequally based on a level of hazard associated with each event and employed to generate a risk score associated with a trip or the driver 11.

Figure 5:
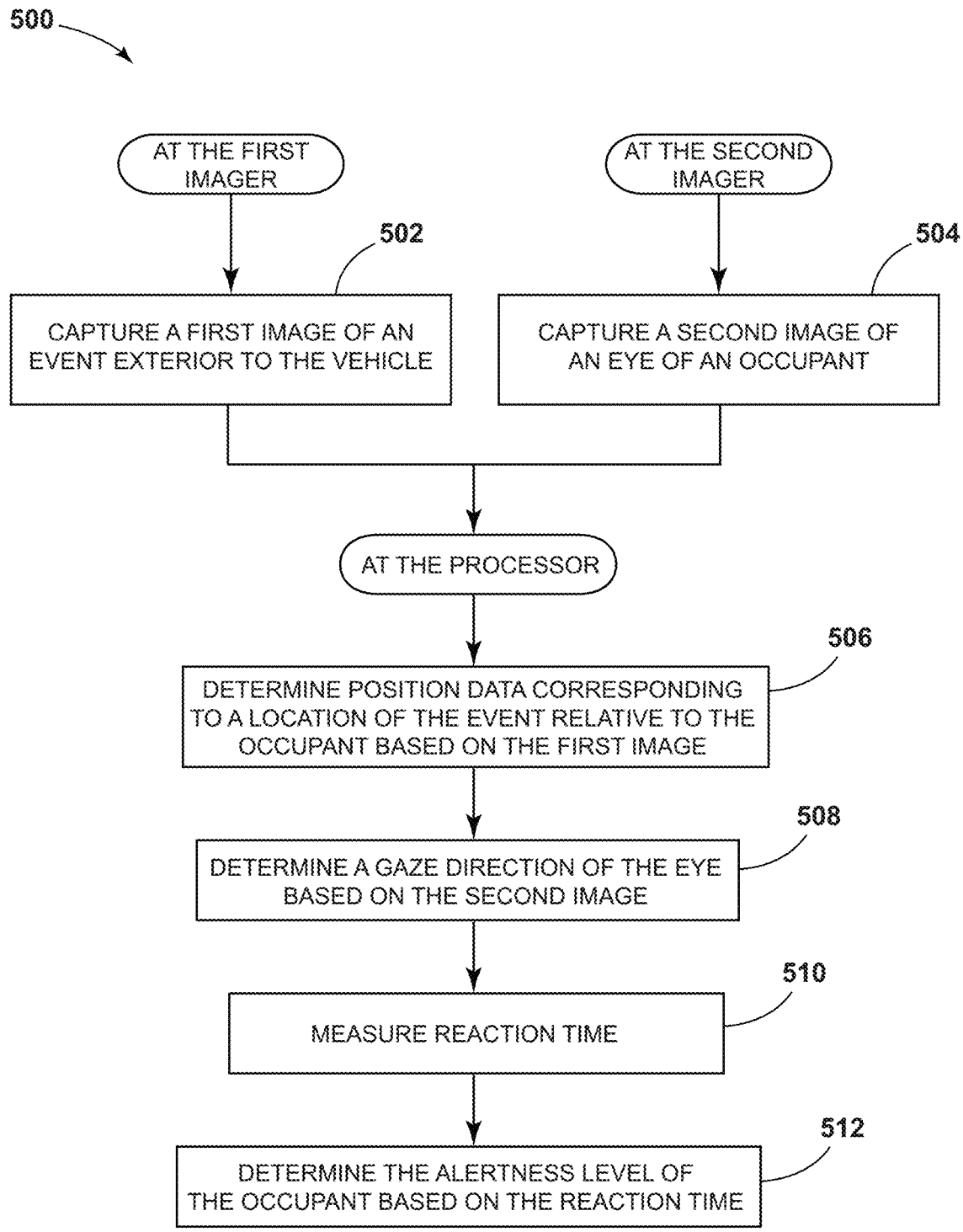
FIG. 5 is a flow chart of a method of determining an alertness level of an occupant of a vehicle in accordance with the disclosure.

Referring now to FIG. 5, the system 10 may provide a reliable process for determining an alertness level of the driver 11 by comparing target ocular features, such as pupillary distance corneal reflection, retinal vessel detection, or the like, to the actual ocular features of the driver 11. More particularly, a method 500 for monitoring the alertness level of the driver 11 may include capturing an event image (e.g., a first image) via a first imager (e.g., sensor 42) at step 502. Concurrently, at 504, a second imager (e.g., imager 22) may capture an interior image (e.g., a second image) of the eye 20 of the driver 11. The controller 28, via one or more processors, may process the first image and determine position data corresponding to a location of the event relative to the driver 11 at step 506. At 508, the gaze direction 34 of the driver 11 may be determined based on the second image. By comparing the gaze direction 34 generated based on the interior image to the target direction 62, the controller 28 may determine that the driver 11 is not looking at the event or is looking at an object designated in the object library to be irrelevant to the operation of the vehicle (e.g., an event having lower priority than the target event).

In the case of the event corresponding to a moving object, the controller 28 may compare a rate of change of the gaze direction 34 and/or a gaze angle to a rate of change of the target direction and/or a target angle. At 510, the controller 28 may measure a reaction time of the driver 11. The reaction time may be a measurement of an elapsed time from a first time corresponding to an occurrence of the event to a second time corresponding to the gaze direction 34 meeting the target direction 62. In this way, the duration from when the sensor 42 (e.g., the second imager) captures the object/event, until the driver 11 focuses on or directs attention to the object/event, may be employed to associate a level of alertness. More particularly, the controller 28 may determine the alertness level of the driver 11 based on the reaction time (512). Applied to the moving object event, reaction time may be associated with a lag of the gaze direction 34 associated with delayed tracking of a moving object. The controller 28 may determine the lag based on the comparison of the gaze angle, or a viewing angle, to the target angle, and determine the alertness level of the driver 11 based on the lag.

The delay between the controller 28 recognizing an event (and determining a target direction 62) and the looking direction of the eye 20 of the driver 11 being directed toward the event may be compared to a database of delay data corresponding to similar events. In this way, the delay may be correlated with an accurate alertness measurement. For example, the database may be employed to determine an average response time of the driver 11 seeing a deer (e.g., the deer 48a of FIG. 4A) within 3 meters of the vehicle. The actual response time of the driver 11 may be compared to the average response time to determine how alert the driver 11 is. It is generally contemplated that the gaze direction 34 may be less detectable when the eyes 20 are closed. The duration of eye closure may further be incorporated with the alertness detection process to identify a particular state of the driver 11. The state may be at least one of an inebriated state, a drunken state, an intoxicated state, a drowsy state, an asleep state, or any state associated with inattentiveness and/or eye closure duration or level of closure.

In general, the response time associated with an attentive state may vary depending on the type of event detected, the proximity of the event relative to the vehicle, and the relative importance of the event. In some cases, a response time of between 1 and 3 seconds may result in an attentive state. In other cases, such as events that are immanent (e.g., an immanent contact with an animal or pedestrian), the response time associated with an attentive state may be in the range of 0.1 to 1 second. In general, the attentive state may refer to the average or median response time of a driver to a similar event. In this way, the various operator states (e.g., attentive, distracted, drowsy, inebriated, drunken, asleep) may be event-based and based on response time estimates from various populations of operators 11. It is generally contemplated that the various non-attentive states (e.g., drowsy, distracted, inebriated, etc.) may be determined further based on the type of event detected. For example, the controller 28 may associate driver attention directed toward the auxiliary events previously described with distraction, and/or the controller 28 may associate a level of eye closure with a drowsiness state. In this way, the system 10 may differentiate between the various operator states and/or alertness levels and curtail specific responses depending on the detected levels or states.

Figure 6:
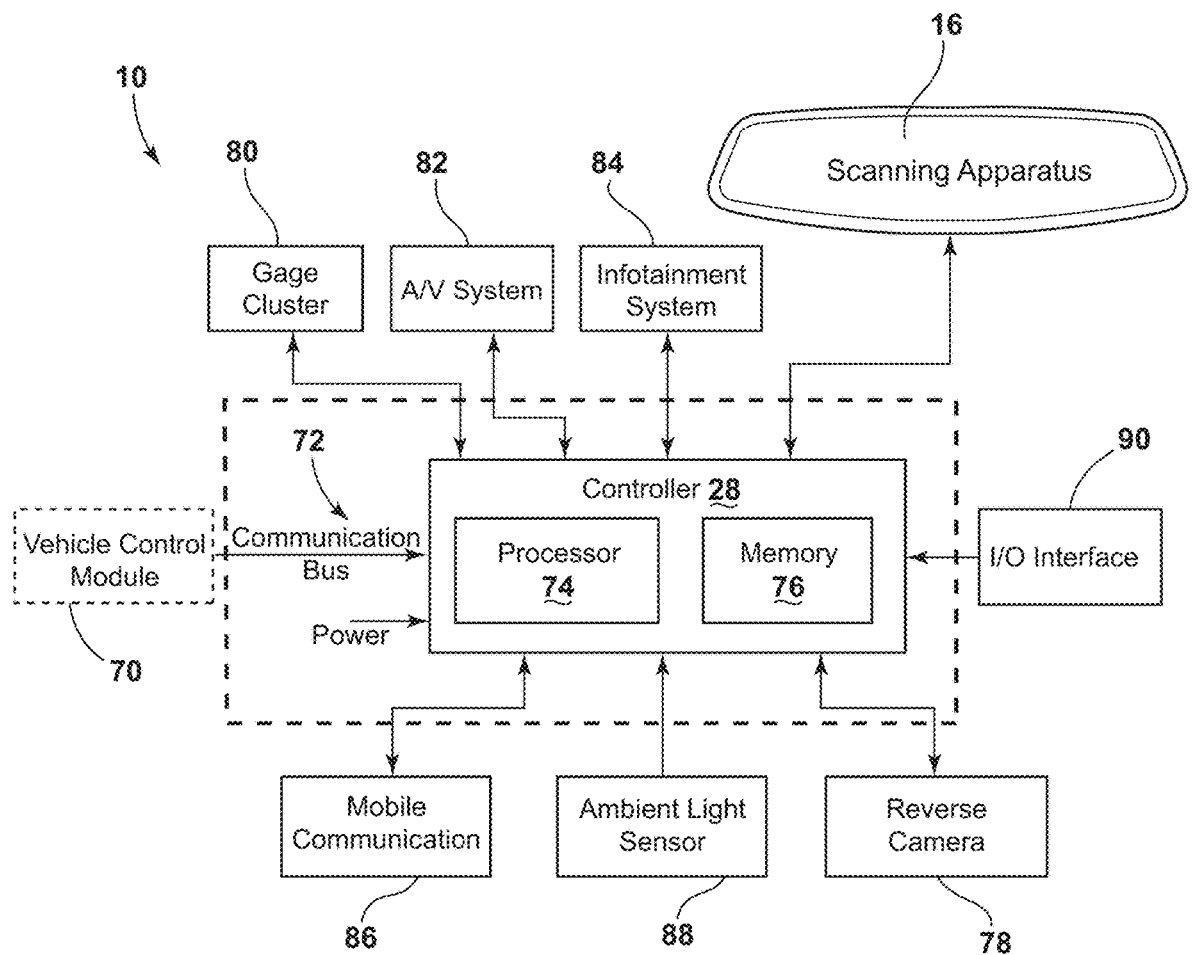
FIG. 6 is a block diagram of an alertness measurement device in accordance with the disclosure.

Referring now to FIG. 6, an exemplary implementation of the alertness measurement system 10 is shown. The controller 28 is shown in communication with the alertness measurement system 10, which may be incorporated in the display assembly 16 or positioned in various portions of the vehicle. The controller 28 may also be in communication with a vehicle control module 70 via a communication bus 72 of the vehicle. The communication bus 72 may be configured to deliver signals to the controller 28 identifying various vehicle states. For example, the communication bus 72 may be configured to communicate to the controller 28 a drive selection of the vehicle, an ignition state, and/or a door open or ajar status. Such information and control signals may be utilized by the controller 28 to activate or adjust various states and/or control schemes of the alertness measurement system 10 and/or the display assembly 16. The communication bus 72 may also be employed to allow the controller 28 to communicate instructions to the various vehicle control systems. For example, as previously described, the controller 28 may communicate instructions to various advanced driver-assistance system (ADAS) modules and/or operator interfaces (such as interface 90) to alert the driver 11 to the state of the driver and/or control the vehicle to slow down, brake, and/or stop. In this way, the communication bus 72 may provide the alertness measurement system 10 a way to influence control over motion of the vehicle and/or communicate with the occupants 11.

The controller 28 may comprise a processor 74 having one or more circuits configured to receive the signals from the communication bus 72 and control the alertness measurement system 10. The processor 74 may be in communication with a memory 76 configured to store instructions to control operations of the alertness measurement system 10. For example, the controller 28 may be configured to store one or more characteristics or profiles utilized by the controller 28 to identify the driver 11 of the vehicle. In this configuration, the controller 28 may communicate operating and identification information with the alertness measurement system 10 to identify the driver 11 of the vehicle. Additionally, based on the identification of the driver 11, the controller 28 may be configured to control and/or communicate with additional systems of the vehicle. Such systems may include a security system, speed governor, radio/infotainment system, etc. In this way, one or more systems of the vehicle may be configured, controlled, or restricted based on the identity and/or alertness of the driver 11.

The controller 28 may further be in communication with a reverse camera 78 or any other form of vehicle camera system. The controller 28 may receive image data from the reverse camera 78 corresponding to a rearward-directed field of view relative to the vehicle. In this configuration, the display screen 30 may provide for the rearward-directed field of view to be displayed. The controller 28 may further be in communication with one or more of a gage cluster 80, an audio/video (A/V) system 82, an infotainment system 84, a media center, a vehicle computing system, and/or various other devices or systems of the vehicle. In various implementations, the controller 28 may display image data from at least one of the imager 22, the reverse camera 78, and the sensor 42.

In some implementations, the controller 28 may utilize the responsiveness of the driver 11 to report updates to an administrator of the vehicle. For example, in some implementations, the controller 28 may further be in communication with a mobile communication system 86. The mobile communication system 86 may be configured to communicate via various mobile communication protocols. Wireless communication protocols may operate in accordance with communication standards including, but not limited to: Institute of Electrical and Electronic Engineering (IEEE) 2.11 (e.g., Wi-Fi™); Bluetooth®; advanced mobile phone services (AMPS); digital AMPS; global system for mobile communications (GSM); code division multiple access (CDMA); Long Term Evolution (LTE or 4G LTE); local multi-point distribution systems (LMDS); multi-channel-multi-point distribution systems (MMDS); radio frequency identification RFID; and/or variations thereof. In this configuration, the controller 28 may be configured to send an alert or message to the administrator of the vehicle in response to one or more predetermined events, such as the driver 11 not directing attention toward an object such as a stop sign or other regulatory signage/signaling. The alert or message may correspond to a text message, data message, email, alert via an application operating on a smart device, etc.

The controller 28 may further be in communication with an ambient light sensor 88. The ambient light sensor 88 may be operable to communicate a light condition, for example, a level of brightness or intensity of the ambient light proximate the vehicle. In response to the level of the ambient light, the controller 28 may be configured to adjust a light intensity output from the display screen 30. The light intensity identified by the ambient light sensor 88 may additionally be adjusted based on the one or more ocular characteristics of the driver 11 as discussed herein. In this configuration, the controller 28 may adjust the brightness of the display screen 30 to provide image data captured by at least one of the imager 22, the sensor 42, and the reverse camera 78.

The controller 28 may also be configured to factor the lighting conditions of the cabin into calculation of alertness detection level and or determination of the state of the driver 11 (e.g., drowsy, sleeping, distracted, etc.). For example, the controller 28 may be configured to detect a first lighting condition, such as nighttime, based on the level of illumination of the cabin. The controller 28 may be configured to associate a delay that occurs during the first lighting condition with drowsiness, as opposed to other states of the driver 11, such as inebriated, distracted, etc. Similarly, the controller 28 may be configured to detect a second lighting condition, such as daytime, based on the level of illumination of the cabin. In response to identifying the second lighting condition, the controller 28 may be configured to associate the alertness level of the driver 11 with a distracted state, as opposed to a drowsy state. In this way, the controller 28 may determine the alertness level and/or the state of the driver 11 based on the lighting conditions.

In some embodiments, the controller 28 may determine that light is emanating from a mobile device, such as a smartphone, tablet, smartwatch, or the like, and incorporate the detection of the mobile device into the determination of the state of the driver 11. For example, the controller 28 may be configured to associate the alertness level or the state of the driver 11 with a distracted state, as opposed to other states, such as a drowsy or inebriated. Accordingly, the controller 28 may communicate an instruction to the various vehicle systems to initiate a response, such as an audible warning that is specific to the detected operator state. In this way, the lighting conditions detected by the controller 28 may be incorporated into determination of the attention level and/or the driver state.

The controller 28 may further be in communication with an interface 90 configured to receive one or more inputs configured to control the alertness measurement system 10. In some implementations, the interface 90 may be combined with one or more devices of the vehicle. For example, the interface 90 may form a portion of the gage cluster, the A/V system 82, the infotainment system 84, a display console, and/or various input/output devices that may commonly be utilized in automotive vehicles (e.g., a steering switch, steering wheel controls, etc.). In this way, the disclosure provides for various control schemes for implementing the alertness measurement system 10 in a vehicle.

The present disclosure may be used in combination with one or more systems, such as that described in U.S. Pat. Nos. 9,838,653; 9,244,249; 9,174,577; 8,960,629; 8,925,891; 8,814,373; 8,201,800; and 8,210,695; and U.S. Provisional Patent Application No. 61/704,869, the disclosures of which are hereby incorporated by reference in their entirety. Further, the present disclosure may be used with a rearview assembly, such as that described in U.S. Pat. Nos. 9,316,347; 8,885,240; 8,814,373; 8,646,924; 8,643,931; and 8,264,761; and U.S. Provisional Patent Application No. 61/707,625, the disclosures of which are hereby incorporated herein by reference in their entirety. It will be understood by one having ordinary skill in the art that construction of the described invention and other components is not limited to any specific material. Other exemplary implementations of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary implementations is illustrative only. Although only a few implementations of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary implementations without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A system for monitoring an alertness level of an occupant of a vehicle, the system comprising:
    a first sensor operable to detect an event exterior to the vehicle;
    a second sensor operable to capture an image of the occupant; and
    a controller in electrical communication with the first sensor and the second sensor, the controller configured to:
        determine a target direction aligning with a region of the event;
        determine a viewing direction of the occupant based on the image;
        compare the target direction to the viewing direction;
        determine the alertness level of the occupant based on the comparison of the target direction to the viewing direction; and
        measure an elapsed time from a first time corresponding to an occurrence of the event to a second time corresponding to the viewing direction meeting the target direction.

2. The system according to claim 1, wherein the controller is further configured to:
    identify the event as a first event and a second event occurring exterior of the vehicle; and
    update the target direction based on a first location of the first event and a second location of the second event.

3. The system according to claim 1, wherein the controller is further configured to:
    differentiate a plurality of different alertness levels based on the elapsed time.

4. The system according to claim 1, wherein the first sensor is a camera operable to capture a scene exterior to the vehicle, and wherein the controller is further operable to identify the event based on image data corresponding to the scene.

5. The system according to claim 4, wherein the event is a movement of an object within a field of view of the camera.

6. The system according to claim 1, wherein the first sensor comprises a plurality of exterior detection sensors comprising at least one proximity sensor and a camera.

7. The system according to claim 1, wherein the event is a change in a state of an object.

8. The system according to claim 7, wherein the change in the state of the object is a change in color associated with the object.

9. The system according to claim 1, wherein the controller is further configured to:
    communicate an instruction to control an indicator based on the alertness level.

10. The system according to claim 1, wherein the controller is further configured to:
    update the alertness level based on a duration an eye of the occupant is open.

11. The system according to claim 1, wherein the controller is further configured to:

determine a target angle of the target direction relative to a forward direction of the vehicle;

compare the target angle to a viewing angle corresponding to the viewing direction; and determine the alertness level based further on the comparison of the target angle to the viewing angle.

12. The system according to claim 1, wherein the controller is further configured to:

detect a lag time associated with the elapsed time for the viewing direction to meet the target direction based on movement of an object exterior to the vehicle; and determine the alertness level of the occupant based further on the lag time of the viewing direction.

13. A method for monitoring an alertness level of an occupant of a vehicle, the method comprising:

capturing first image data of an exterior field of view proximate to the vehicle;

capturing second image data of an eye of the occupant;

determining position data corresponding to a first location of a first event relative to the occupant based on the first image data;

determining a gaze direction of the eye based on the second image data;

measuring lag time indicative of a delay between a first time corresponding to an occurrence of the first event to a second time corresponding to the gaze direction directed to a target direction toward the first location of the first event; and determining the alertness level of the occupant based on the lag time.

14. The method according to claim 13, wherein the controller is further configured to:

identifying a second location of a second event in the exterior field of view; and updating the target direction from the first location to the second location.

15. The method according to claim 13, wherein the first event is a movement of an object in the first image data.

16. The method according to claim 13, wherein the first event is a change in a state of an object.

17. The method according to claim 16, wherein the change in the state of the object is a change in color associated with the object.

18. The method according to claim 16, further comprising:

communicating an instruction to control an indicator in the vehicle based on the alertness level.

19. The method according to claim 13, further comprising:

differentiating a plurality of different alertness levels based on a duration of the lag time.

20. A system for monitoring an alertness level of an occupant of a vehicle, the system comprising:

a first sensor operable to detect an event exterior to the vehicle, wherein the event is a movement of an object;

a second sensor operable to capture an image of the occupant; and a controller in electrical communication with the first sensor and the second sensor, the controller configured to:

determine a target direction aligning with a region of the event;

update a viewing direction based on the movement of the object;

determine the viewing direction of the occupant based on the image;

compare the target direction to the viewing direction; and determine the alertness level of the occupant based on the comparison of the target direction to the viewing direction, wherein the alertness level is determined by identifying a correspondence of the movement of the object with the viewing direction, wherein the correspondence is determined based on a lag time required for the viewing direction of the occupant to meet the target direction.

* * * * *